United States Patent [19]

Jones

[11] Patent Number: 4,524,912

[45] Date of Patent: Jun. 25, 1985

[54] AGRICULTURAL PORTABLE CHEMICAL APPLICATOR WITH PROTECTIVE SHIELD

[75] Inventor: William R. Jones, Crystal Springs, Miss.

[73] Assignee: J/Mac Corporation, Jackson, Miss.

[21] Appl. No.: 497,125

[22] Filed: May 23, 1983

[51] Int. Cl.³ .................. B05B 15/04; B05B 1/28; A01C 15/00

[52] U.S. Cl. .................. 239/150; 47/1.7; 239/288

[58] Field of Search .............. 239/150, 172, 360, 288, 239/275; 47/1.7; 111/7.1–7.4

[56] References Cited

U.S. PATENT DOCUMENTS

| | | | |
|---|---|---|---|
| 2,377,780 | 6/1945 | Hahn | 239/150 |
| 2,754,622 | 7/1956 | Rohnert | 239/172 X |
| 2,812,211 | 11/1957 | Gardner | 239/150 |
| 2,883,115 | 4/1959 | Converse | 239/172 |
| 2,964,245 | 12/1960 | Anderson et al. | 239/150 |
| 3,023,969 | 3/1962 | Hudson | 239/360 X |
| 3,050,260 | 8/1962 | Macrae et al. | 239/150 |
| 3,267,610 | 8/1966 | Hills | 239/275 X |
| 3,373,938 | 3/1968 | Sweet | 239/150 X |

FOREIGN PATENT DOCUMENTS

| | | | |
|---|---|---|---|
| 494012 | 6/1950 | Belgium | 239/150 |
| 14720 | of 1896 | United Kingdom | 239/587 |
| 1152847 | 5/1969 | United Kingdom | 47/1.7 |

Primary Examiner—Andres Kashnikow
Assistant Examiner—Kevin Patrick Weldon
Attorney, Agent, or Firm—Llewellyn B. Proctor

[57] ABSTRACT

An applicator for use by an operative in applying a liquid spray of chemicals, insecticides, herbicides or the like to growing plants, shrubs, or weeds. The applicator is comprised of a carriage, constituted of a frame provided with a pair of alternately disposed wheels mounted on an axle located at the lower end of the frame, and handle located at the upper end of the frame. A tank within which liquid can be provided is detachably mounted and supported upon the lower end of the carriage. The tank contains a pumping assembly, and the pump can be activated to pressurize the liquid. A spray nozzle assembly, inclusive of a pivotally movable spray nozzle is operatively communicated with said tank for the transfer of liquid from the tank to the spray nozzle for application to the growing plants, shrubs, or weeds. The spray nozzle assembly is mounted on at the lower end of the carriage frame, and it includes means, inclusive of control means located on the carriage handle for use by the operative in controlling and directing the flow of liquid from the spray nozzle. An adjustably mounted spray guard of planar shape is mounted on the side of the carriage such that the narrow edges thereof are vertically oriented, and an inside flat side of the guard faces the spray nozzle of the spray nozzle assembly to restrict and control the area of application of the spray of liquid emitted from the spray nozzle, and to facilitate movement of the applicator through the plants, shrubs, or weeds.

8 Claims, 7 Drawing Figures

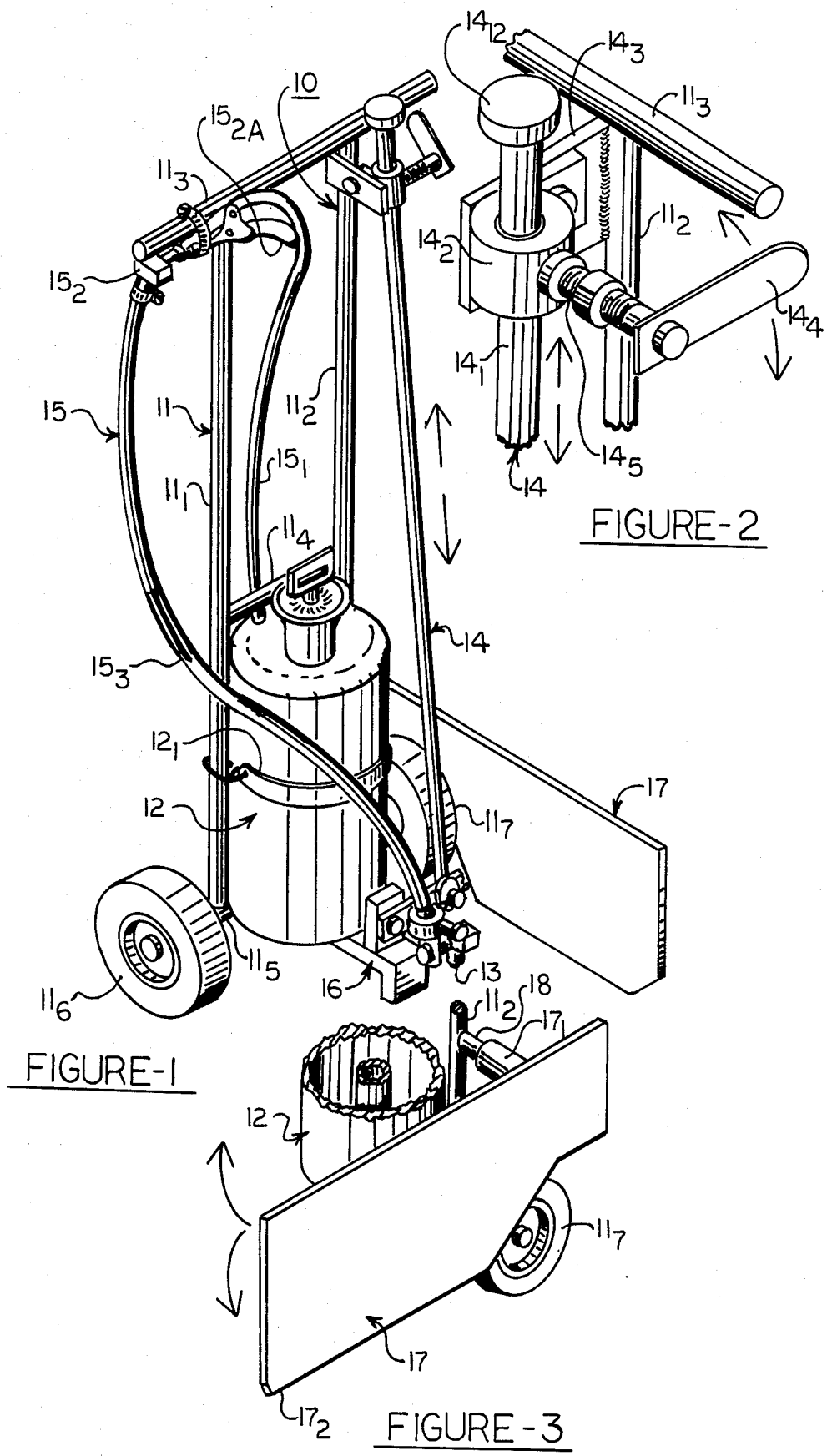

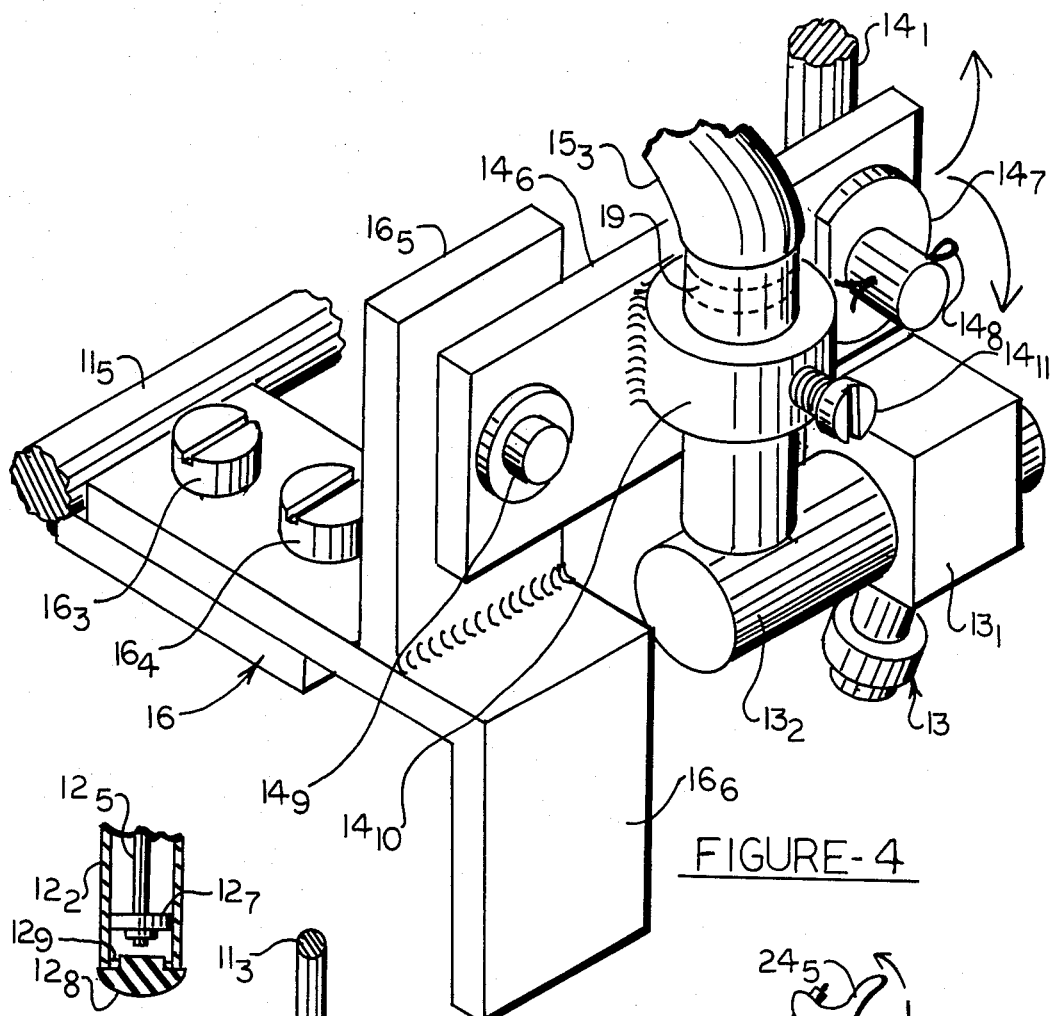
FIGURE-4
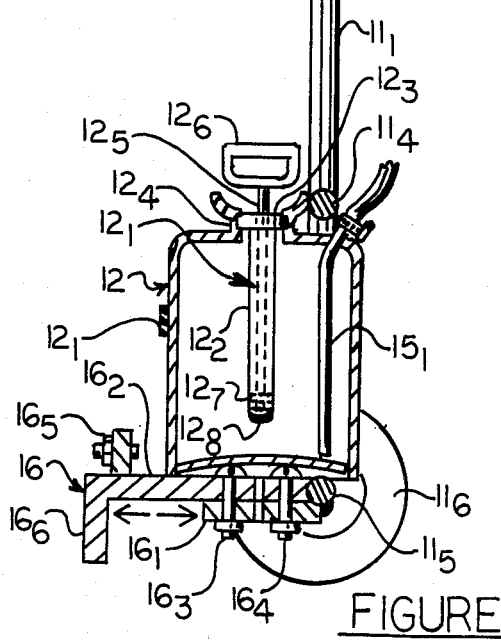
FIGURE-5A
FIGURE-5
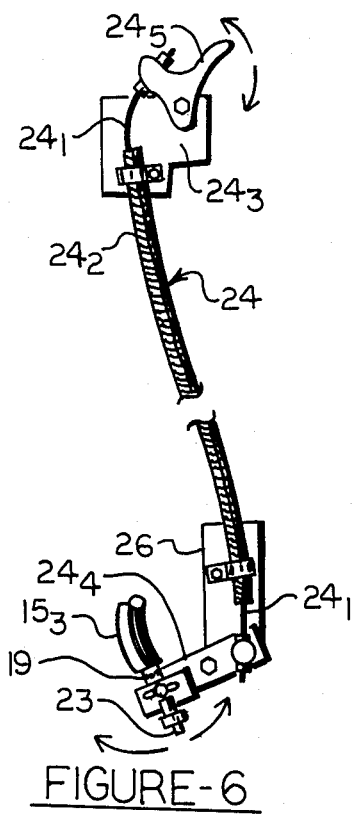
FIGURE-6

AGRICULTURAL PORTABLE CHEMICAL APPLICATOR WITH PROTECTIVE SHIELD

FIELD OF THE INVENTION

This invention relates to an applicator for the selective application of a liquid, i.e. a chemical or biocide, to a plant, shrub, or weed.

BACKGROUND OF THE INVENTION

The art, or science of cultivating plants, whether for pleasure or profit, requires the application to plants of chemicals or biocides e.g., fertilizers, insecticides, herbicides, and the like often in the form of liquids, or liquid solutions. Certain favored plants, e.g., must be protected from competition with other plants, i.e. weeds. Weeds are destroyed to make room for the cultivated plants.

In modern gardening, herbicides as liquids or liquid solutions are often applied to weeds. In such applications it is desirable, and often essential to apply the liquid only upon the weeds while minimizing or avoiding contact between the liquid and the cultivated plants. Some few herbicides are selective, killing certain types of weeds, while leaving the cultivated plants unharmed. Other herbicides however are less selective, or lacking in selectivity. Some herbicides thus damage, or injure the cultivated plants as well as the weeds, and some may even kill every plant with whose leaves they come into contact. It is thus desirable to control the applications of the herbicides, or weed killers, to prevent waste, if indeed it is not desirable, or even essential to prevent injury, or destruction of the cultivated plants.

Apparatus, or machinery, for spraying plants of various types are well known. A large class of such apparatus is that used for spraying orchards, or that used by large agricultural establishments, these taking the form of relatively large, complex pieces of equipment. Such equipment, as described e.g. in U.S. Pat. No. 3,216,664 and U.S. Pat. No. 3,227,376, generally includes a wheeled vehicle which carries a tank of the material to be dispersed, a large fan or blower to create a large volume, high velocity air blast, a self-contained power plant, and pump for pumping the liquid from the tank into the air stream for dispersement. Smaller, far less complex portable sprayers have also been designed and carried on the backs of or been towed by individual operatives; and small applicators with liquid fillable tanks have also been mounted on wheels, and thereby been made transportable for use by individual operatives.

In U.S. Pat. No. 3,267,610 there is described an applicator for applying a liquid spray to the ground at the base of a tree. The applicator is constituted of a liquid fillable tank, and a movable applicator inclusive of an elongated handle, movable applicator head, and shield. The movable applicator is connected to a tank via a long flexible hose. A major difficulty with this apparatus, inter alia, is that the operative must carry the movable applicator portion while using same, and it is tethered via the flexible hose to the tank, and the hose must be dragged about while the tank is rested upon the ground in a spotted location.

Applicators wherein a tank has been mounted on a wheeled carriage are described in U.S. Pat. No. 2,740,664 and U.S. Pat. No. 2,581,678. These applicators, albeit they can be propelled by an operative nonetheless suffer certain deficiencies not the least of which is related to their undue complexity, lack of mobility and low selectivity in targeting the plants and shrubs on which liquid is to be applied.

OBJECTS OF THE INVENTION

It is accordingly the primary objective of the present invention to provide a new, improved self contained applicator of simple compact construction and light weight which can be readily moved, or propelled by an operative through narrow spaces between rows of cultivated plants and shrubs, and liquid selectively applied to growing weeds.

A particular object is to provide an applicator of such character which can be moved, or propelled with great facility by an operative even over loose, and sometimes wet soil with minimal obstruction offered by growing plants, shrubs or weeds.

A further, and more specific object is to provide an applicator further characterized in that the applicator carries a tank of liquid which can be pressurized with minimum inconvenience by the operative and, while the applicator is being propelled, the liquid can be cut-off or released as a spray from an adjustably movable nozzle located on the bottom of the applicator near ground level, via hand actuation by the operative of a nozzle control means, located on the handle of the applicator; and the spray can be controlled, and interrupted via actuation of a cut-off valve also located on the handle.

SUMMARY OF THE INVENTION

These objects and others are achieved in accordance with the present invention, an applicator or apparatus for the controlled spraying of a liquid upon growing plants or shrubs. The apparatus includes generally a carriage, a tank detachably mounted on a bracket frame constituting a part of said carriage, a spray nozzle assembly means, and spray guard for controlling the area of application of the spray. The carriage is constituted of a frame provided with a pair of alternately disposed wheels mounted on an axle located at the lower end of said frame, and handle located at the upper end of said frame. A platform, or bracket frame is located on the lower end of the carriage, and projected outwardly from the carriage frame, for supporting the tank which can be detachably mounted on said bracket frame.

The tank is constituted of an outer shell, preferably with an opening within which a pump assembly can be located. The pump assembly can be removed for filling the tank with liquid, replaced after filling with the tank with liquid, and in place the pump can be conveniently activated by the hand of the operative to pressurize the liquid. The spray nozzle assembly means includes a pivotally movable spray nozzle operatively communicated with said tank. The spray nozzle is mounted on the bracket frame at the lower end of the carriage frame, and it is provided with control means located on the handle of the carriage for use by a hand of the operative for movement of the spray nozzle through a range of angles of application. In one form, the control means is constituted of a movable cable extending from the applicator to the spray nozzle for the adjustment and movement of the latter. In another form, the control means is comprised of a reciprocable elongate shaft a terminal end of which is engaged with the spray nozzle while the other end extends to the carriage frame handle for the convenience of the operative in adjusting the spray of liquid from the spray nozzle. The spray guard is of substantially planar shape though the forward end thereof can be slightly curved if desired. The spray guard is mounted on the side of the carriage such that the plane of movement of the narrow edges thereof is vertically oriented, and the spray guard is adjustably movable within said plane. An inside flat side of the spray guard can be adjusted to face the spray nozzle of the spray nozzle assembly to restrict and control the area of application of the spray of liquid emitted from the spray nozzle, the shape or pattern of which can be controlled in part by the nozzle design. The alignment of the narrow edges of the guard are in the direction of the forward movement of the carriage to facilitate movement of the carriage through the plants and shrubs with minimum obstruction.

DETAILED DESCRIPTION OF THE INVENTION

The invention, and its principle of operation, will be more fully understood by reference to the following detailed description of a specific embodiment, and to the attached drawings to which reference is made in the description. In the description, similar numbers are used to represent similar parts or components, and subscripts are used to designate the several parts of a complete sub-assembly.

In the drawings:

FIG. 1 depicts in perspective a preferred spray applicator inclusive of a two wheeled carriage, a tank supported thereon within which a liquid can be contained, a spray nozzle assembly, inclusive of spray nozzle, a spray nozzle eontrol mechanism, and a spray guard, or shield.

FIG. 2 is an enlarged fragmentary, right side view of the upper spray nozzle control mechanism of the applicator depicted in FIG. 1.

FIG. 3 is an enlarged fragmentary, right side view of the lower side of the applicator this view depicting the spray guard, or shield, and supporting structure.

FIG. 4 is an enlarged fragmentary view of the spray nozzle and supporting mechanism located at the lower end of the carriage, adjacent the shield.

FIG. 5 is a right section view of the tank, with its included pump and supporting structure; and FIG. 5A is an enlarged segment of the pump.

FIG. 6 depicts a preferred type of a spray nozzle control mechanism.

Referring to the figures, first to FIG. 1, there is shown a spray applicator 10 which includes generally a carriage 11, a tank 12 which can be filled with a liquid, a liquid spray nozzle assembly, inclusive of a spray nozzle 13, a nozzle adjustment mechanism 14, a valved conduit 15 for conveying pressurized liquid from the tank 12 to the spray nozzle 13, and a spray guard, or shield 17.

The carriage 11 of the spray applicator 19 is constituted of a frame formed by a pair of spaced apart parallel aligned bars $11_1$, $11_2$ of equal length, the bars $11_1$, $11_2$ being secured together by the upper lateral bar $11_3$, the intermediate lateral bar $11_4$, and the lower lateral bar $11_5$. The upper lateral bar $11_3$ and the lower lateral bar $11_5$ are of greater length than the lateral distance between bars $11_1$, $11_2$, the terminal ends thereof extending beyond the confines defined by the lateral distance between bars $11_1$, $11_2$. The bar $11_3$ provides a convenient handle for an operative, and the bar $11_5$ provides an axle, or axle support, on which a pair of wheels, e.g. hard rubber tired wheels, $11_6$, $11_7$ can be mounted. On the lower side of the frame of the carriage there is located a platform, or bracket frame 16 of adjustable depth, or length, on which the tank 12 can be mounted and supported.

The bracket frame 16 is mounted generally forward of the axle $11_5$, and inside the pair of wheels $11_6$, $11_7$. The bracket frame 16 is preferably of adjustable size. It is thus constituted of a lower flat segment $16_1$ and an upper flat segment $16_2$, the upper flat segment $16_2$ being slidably movable inwardly or outwardly relative to the lower flat segment $16_1$; the two members being bolted together and affixed one to the other via a pair of bolts $16_3$, $16_4$ after adjustment of the bracket frame 16 to the desired length. The upwardly projected shank $16_5$ provides a hinge support upon which the spray nozzle 13 can be mounted, and the downwardly projected shank $16_6$ provides, with wheels $11_6$, $11_7$, a means for support of the applicator 10, and carriage 11 in a generally vertical orientation, or upright position.

The tank 12 is supported atop the bracket frame 16 of the carriage 11, and can be conveniently held in place against the parallelly aligned bars $11_1$, $11_2$ via a bunge chord $12_1$, i.e. an elastic chord which wraps around or encompasses the diameter of tank 12 and has hook-shaped metal ends which can be conveniently secured one to the other, or upon the bars $11_1$, $11_2$. The tank 12 can be filled with a liquid biocide, e.g., an insecticide or herbicide solution, and the solution then pressurized within the tank.

The tank 12 is connected via a valved flexible hose, conduit, or tubing 15, i.e. conduit sections $15_1$, $15_3$, to the spray nozzle assembly; the lower terminal end of conduit section $15_3$ being passed through a collar $14_{10}$ (FIG. 4) located upon a flat hinge tab $14_6$ for connection with the upwardly projecting tubular portion of the tubular segment $13_2$ of the spray nozzle 13. The lower terminal end of the upwardly projecting tubular segment and flexible conduit $15_3$ is held securely in place within the collar $14_{10}$ via tightening down the screw $14_{11}$, the terminal end of the screw abutting and pressing against the conduit $15_3$ and the upwardly projecting portion of tubular segment $13_2$. The tubular segment $13_2$ can be slidably moved upwardly or downwardly within the collar $14_{10}$ for adjusting the height of the spray nozzle 13 above ground level. Pressurized liquid within the tank 12 exits, when valve $15_2$ is opened via passage upwardly through the segment of conduit $15_1$, and the segment of conduit $15_3$, which leads through a one-way flow valve 19 to the spray nozzle 13. The valve 19 permits flow of liquid when the tank 12 is pressurized, and prevents liquid drip from the nozzle 13 when the tank 12 is not pressurized. The valve $15_2$, which is affixed upon the handle $11_3$ of the carriage frame, is biased in closed position and conveniently opened by inward movement of valve handle $15_{2,4}$, as by the hand of an operative.

One form of the nozzle adjustment mechanism 14, referring for convenience to FIGS. 1 and 2, is constituted of an elongated movable shaft, or lever $14_1$, the upper end of which is adjustably affixed and slidably movable within a collar lock assembly (FIG. 2). The collar lock assembly includes a tubular member $14_2$ which is secured upon the projecting shank or tab $14_3$ which, in turn, is rigidly affixed to, or mounted as by welding upon the bar $11_2$. The tubular member $14_2$ contains an internally threaded lateral opening within which is provided a laterally movable externally threaded mating shaft $14_5$ which can be rotated via upward or downward movement of handle $14_4$ to move the end of said shaft $14_5$ into or away from engagement with the lever $14_1$ to bind and lock the lever $14_1$ in fixed position, or to loosen the lever $14_1$ to permit slidable movement thereof within the tubular member $14_2$. The handle $14_4$ is suitable provided with a handle grip to facilitate the use of the collar lock assembly at the hands of an operative.

The lower terminal end of the lever $14_1$, referrring for convenience to FIGS. 1 and 4, is hinged with, or pivotally engaged to an end of the flat tab $14_6$, the opposite end of which is, in turn, pivotally attached via passage of a pin $14_9$ through a washer and an end opening within the flat, rigidly affixed tab $16_5$ for engagement with the member $16_5$. The lower terminal end of the lever $14_1$ is provided with a projecting shank, or bent at a right angle, and passed through an opening within an end of the flat plate or tab $16_5$, a washer $14_7$ is fitted thereover, and the lower terminal end of the lever $14_1$ is held in place by a cotter key $14_8$ affixed within a small opening within said lever $14_1$. The upward or downward movement of lever $14_1$ is readily controlled by the hand of an operative who releases the pressure of the shaft $14_5$ by movement of handle $14_4$ who can then pull upwardly or push downwardly on knob $14_{12}$ to move the lever $14_1$. Upward movement of lever $14_1$ rotates the outer end of flat tab $14_6$ upwardly about the pivot pin $14_9$ and moves, or redirects the spray nozzle 13 outwardly in the direction of the spray guard 17. Or, alternatively, downward movement of lever $14_1$ rotates the outer end of flat tab $14_6$ downwardly about the pivot pin $14_9$ and moves, or redirects the spray nozzle 13 inwardly in a direction away from the spray guard 17. The direction of the spray nozzle 13 is also controlled by hand rotation of the hexagonal faced hollow block $13_1$ upon the small diameter tubular shaped body $13_2$, to an upper side of which the terminal end of the flexible conduit $15_3$ is adjoined. The spray nozzle 13, and consequently the liquid spray itself can be directed toward the front side of the spray applicator 10 by clockwise rotation of the hexagonal faced blocked $13_1$ upon the tubular body $13_2$ or to the rearward side of the spray applicator 10 by counterclockwise rotation of the hexagonal faced blocked $13_1$ upon the tubular body $13_2$. Thus, referring to FIG. 1, pressurized liquid flows upwardly from tank 12 through the segment of flexible conduit $15_1$, through open valve $15_2$, and then downwardly through the flexible conduit $15_3$ into the inside chamber of tubular body $13_2$, then into a connecting chamber within hexagonal block $13_1$ and outwardly through spray nozzle 13. Spray nozzles of various design can be employed to control in part the pattern of the liquid spray direct therefrom.

With reference to FIG. 6, there is depicted a second preferred type of spray nozzle control mechanism 24. In accordance with this type of spray nozzle control mechanism a cable $24_1$ is passed through and slidably movable within a semi-flexible tubular member $24_4$ rigidly affixed to the carriage 10. The tubular member 24 is thus affixed at an upper end to a plate $24_3$, which in turn is mounted upon the bar $11_1$, and is affixed at its lower end to a plate $24_4$, which in turn carries the nozzle 23 and is pivotably mounted via a plate 26 upon the bracket frame 16. One end of the cable $24_1$ is attached to a movable side of the handle $24_5$, pivotally mounted upon the plate $24_3$, and the other end of the cable $24_1$ is attached to the pivotal plate $24_4$ which carries the spray nozzle 23. Movement of the handle $24_5$ by the hand of an operative pulls and slides the cable $24_1$ upwardly or downwardly within the tubular member $24_2$ and in turn moves the spray nozzle 23 upwardly or downwardly to direct the liquid spray.

The tank 12, referring to FIGS. 5 and 5A, can be filled with liquid by removal of the entire pump assembly $12_1$ from its central location within the top of the tank 12, and after filling the pump assembly $12_1$ is simply put back in place for application of the liquid which is sprayed via nozzle 13 upon the plants or shrubs which are to be treated with the liquid. The pump assembly $12_1$ is constituted of a hollow tubular body or shell $12_2$ provided with a flange or collar $12_3$ by virtue of which the tubular body can be affixed, and sealed within the neck $12_4$ of the tank 12. A plunger $12_5$, provided at its upper end with a handle $12_6$, is reciprocably fitted within the hollow tubular body, or shell 12. The lower portion of the plunger $12_5$ is provided with a seal $12_7$ which provides wiping contact with the inside wall of hollow tubular body, or shell $12_2$, and the lower end of the hollow tubular body, or shell $12_2$ contains one-way flow valve $12_8$ through which air can be expressed via downward movement of the plunger $12_5$ to pressurize the tank 12. Upward movement of the plunger $12_5$ thus permits air to flow via valved passageway $12_9$ into the interior of shell 12 to fill same, and downward movement of the plunger $12_5$ forces the air under pressure through valve $12_8$ into the tank. Repeated reciprocation of the plunger $12_5$, as by the arm of an operative who gasps the handle $12_6$ with his hand, fills the tank 12 with air to pressurize up to a certain preselected level the liquid within the tank. Another one-way check valve, if desired, can be used to prevent this pressure from being exceeded when the pump is pressurized.

The guard 17, or shield, is removably mounted on the same side of the carriage 11 as the spray nozzle 13. If desired, a similar guard and spray nozzle can be mounted on the opposite side of the carriage; or, the guard and spray nozzle herein referred to could be singularly mounted on the opposite side of the carriage. The guard 17, in any event, is a substantially planar member mounted with its narrow edges vertically oriented relative to the earth surface, with the inner flat side facing toward the spray nozzle assembly, or spray nozzle 13. The inner face of the guard 17 is provided with an elongate tubular member $17_1$, which fits in socket fashion over the projecting shaft 18 to provide a pivotal mounting. The carriage 11 is thus provided with an elongated shaft member 18 extending from the vertical bar $11_2$, and the inner face of the shield 17 is provided with a tubular socket member $17_1$ which fits over and mates with the shaft member 18 to provide a hinged connection. A lower forward edge $17_2$ of the guard 17 can be, and when the applicator 10 is in use, is maintained at a level slightly above the level of the ground, and horizontal therewith. The guard 17 is maintained in this position by a lower forward inclined edge thereof which resets against the axle $11_5$. The forward end of guard 17 can also be rested upon the ground, as when the carriage itself is in rest position. The guard 17 can also be conveniently removed as when it is desirable to spray as wide an area as possible.

When the carriage 11 is moved forwardly, with the guard 17 in a position slightly above and substantially parallel with the ground, the narrow substantially straight edge position thereof cuts through plants or shrubs with a minimum of resistance. Liquid spray from the spray nozzle 13 is applied generally downwardly, any portion of the laterally directed spray impinging on the inner face of guard 17 to confine the outer edge of the spray area to that generally defined by the edge $17_1$ or guard 17. A guard, or shield of this type, unlike prior art aprons and the like, permits virtually unimpeded movement of the carriage through plants and shrubs. The movable nature of the guard 17 permits placing this member in a position which will provide the greatest protection to the plants and shrubs which are to be cultivated, or in position which will permit greater utilization of the spray on application of the liquid to the cultivated plants or shrubs.

It is apparent that various modifications and changes can be made without departing the spirit and scope of the present invention. Changes in the absolute or relative dimensions of the parts, materials of construction used and the like will be apparent to those skilled in the art. For example, whereas the guard, or shield, is of substantially planar shape, the forward end thereof can be bent very slightly inwardly, or curved. However, too much bending can impede the movement of the applicator. The absolute size and shape of the component parts of the applicator, e.g. the tank, can vary. The component parts, e.g. the tank, can be made of various materials which are non-reactive or inert with the liquid chemicals which are used. The size, shape and kind of flow nozzle can also vary dependent upon the spray distribution that is desired.

The tank can be constructed of a metal or plastic material, a plastic or metal such as stainless steel being preferred. The valves, and parts of the carriage are generally constructed of metal, e.g. ferrous metals such as iron, iron alloys, and the like. The flexible conduit can be constructed of synthetic rubber, plastic or the like as will be apparent to those skilled in the art.

Having described the invention, what is claimed is:

1. An applicator for use by an operative in applying a liquid to plants or shrubs growing within the earth which comprises a carriage, constituted of a frame provided with a pair of alternately disposed wheels mounted on an axle located at the lower end of said frame, and handle located at the upper end of said frame, a bracket frame located on the lower end of the carriage, projected outwardly from the carriage frame, a tank supported on said bracket frame, said tank being constituted of an outer shell with an upper opening within which a pump assembly can be removed for filling the tank with liquid, replaced after filling with the tank with liquid, and the pump activated to pressurize the liquid, a spray nozzle assembly, inclusive of a pivotally movable spray nozzle operatively communicated with said tank via a conduit for the receipt of liquid therefrom mounted on the bracket frame at the lower end of the carriage frame, said spray nozzle of the spray nozzle assembly being pivotally mounted via a hinge element to the bracket frame, and means for actuation and movement of the spray nozzle via mechanism located in part upon the carriage frame handle, said means including an elongated shaft the lower end of which is pivotally mounted to said spray nozzle, and the upper terminal end of which is reciprocably mounted within a collar lock assembly located on the handle of the carriage frame whereby the elongated shaft can be reciprocably moved within the collar to change the direction of the spray nozzle, or locked in position within the collar lock assembly to fix the direction of the spray nozzle, and a guard of substantially planar shape mounted on the side of the carriage adjacent the spray nozzle such that the narrow edges thereof are vertically oriented, the inner flat side of the guard facing the spray nozzle of the spray nozzle assembly to restrict and control the area of application of the spray of liquid emitted from the spray nozzle, the narrow edges of the guard being aligned in the direction of forward movement of the carriage to minimize physical contact between the guard and the plants or shrubs through which the applicator is moved.

2. The apparatus of claim 1 wherein the size of the bracket frame located on the lower edge of the carriage is adjustable.

3. The apparatus of claim 1 wherein the forward end of the bracket frame located on the lower edge of the carriage is provided with a downwardly directed projection which, with the wheels provides a means of standing the applicator in an essentially vertical orientation.

4. The apparatus of claim 1 wherein the conduit which operatively connects the spray nozzle to the tank is valved, and the valve is located on the handle of the carriage for convenience in opening and closing by a hand of the operative to release liquid from the tanks to the spray nozzle.

5. The apparatus of claim 1 wherein the planar shaped guard is pivotally mounted via a shaft to the carriage frame, and when the carriage is in motion, the guard is located with the lower narrow edge thereof parallel to and slightly above ground level; and, when the carriage is not in motion, the front end of the guard can be rested upon the ground and, the guard can be removed from the carriage.

6. The apparatus of claim 1 wherein the means for actuation and movement of the spray nozzle is constituted of a cable connected via the hinge element pivotally mounted upon the bracket frame, the cable being moved by actuation of a handle located upon the carriage handle.

7. The apparatus of claim 1 wherein the spray nozzle is constituted of a tubular body, and larger member rotatably mounted thereupon which carries the nozzle per se, the direction of the nozzle per se being adjustable by rotation about the tubular body.

8. The apparatus of claim 7 wherein the angle of rotation of the larger member is at right angles to the angle of rotation of that produced by movement of the elongated shaft.

* * * * *